(12) United States Patent
Lee et al.

(10) Patent No.: US 9,075,465 B2
(45) Date of Patent: Jul. 7, 2015

(54) METHOD OF IDENTIFYING TOUCH EVENT ON TOUCH PANEL BY SHAPE OF SIGNAL GROUP AND COMPUTER READABLE MEDIUM THEREOF

(71) Applicant: HIMAX TECHNOLOGIES LIMITED, Tainan (TW)

(72) Inventors: Chin-Lin Lee, Tainan (TW); Shen-Feng Tai, Tainan (TW); Jui-Min Liu, Tainan (TW); Chun-Yen Liu, Tainan (TW)

(73) Assignee: HIMAX TECHNOLOGIES LIMITED, Fonghua Village, Xinshi Dist., Tainan (TW)

( * ) Notice: Subject to any disclaimer, the term of this patent is extended or adjusted under 35 U.S.C. 154(b) by 96 days.

(21) Appl. No.: 13/769,840

(22) Filed: Feb. 19, 2013

(65) Prior Publication Data

US 2014/0232661 A1    Aug. 21, 2014

(51) Int. Cl.
G06F 3/041 (2006.01)
(52) U.S. Cl.
CPC ...... G06F 3/041 (2013.01); *G06F 2203/04104* (2013.01)
(58) Field of Classification Search
CPC .................. G06F 3/041; G06F 2203/04104
USPC .................. 345/156, 173, 174; 382/312–314; 178/18.01, 18.03, 18.06
See application file for complete search history.

(56) References Cited

U.S. PATENT DOCUMENTS

| | | | | |
|---|---|---|---|---|
| 8,294,687 | B1 * | 10/2012 | Ksondzyk | 345/173 |
| 8,564,546 | B1 * | 10/2013 | Birch | 345/173 |
| 2006/0097991 | A1 | 5/2006 | Hotelling | |
| 2007/0109274 | A1 * | 5/2007 | Reynolds | 345/173 |
| 2008/0158147 | A1 * | 7/2008 | Westerman et al. | 345/156 |
| 2008/0158168 | A1 * | 7/2008 | Westerman et al. | 345/173 |
| 2009/0195517 | A1 * | 8/2009 | Duheille et al. | 345/177 |
| 2010/0073318 | A1 * | 3/2010 | Hu et al. | 345/174 |
| 2010/0271317 | A1 * | 10/2010 | Hsieh et al. | 345/173 |
| 2010/0315372 | A1 * | 12/2010 | Ng | 345/174 |
| 2010/0321328 | A1 * | 12/2010 | Chang et al. | 345/174 |
| 2011/0074544 | A1 * | 3/2011 | D'Souza | 340/5.83 |
| 2011/0074725 | A1 * | 3/2011 | Westerman et al. | 345/174 |
| 2012/0062474 | A1 * | 3/2012 | Weishaupt et al. | 345/173 |
| 2012/0105366 | A1 * | 5/2012 | Lai et al. | 345/174 |
| 2012/0306806 | A1 * | 12/2012 | Yang et al. | 345/174 |
| 2013/0176270 | A1 * | 7/2013 | Cattivelli et al. | 345/174 |
| 2013/0176275 | A1 * | 7/2013 | Weaver et al. | 345/174 |
| 2013/0234978 | A1 * | 9/2013 | Ksondzyk | 345/174 |

FOREIGN PATENT DOCUMENTS

| | | |
|---|---|---|
| TW | 201101132 | 1/2011 |
| TW | 201211864 | 3/2012 |
| TW | 201248464 | 12/2012 |

* cited by examiner

*Primary Examiner* — Priyank Shah
(74) *Attorney, Agent, or Firm* — Winston Hsu; Scott Margo

(57) ABSTRACT

An exemplary method of identifying a touch event on a touch panel is provided. The touch panel includes a plurality of sensing blocks. The sensing blocks have a plurality of corresponding sensing values generated in response to the touch event. The exemplary method includes the following steps: selecting a processing region on the touch panel, wherein the processing region comprises at least a portion of sensing blocks each having a sensing value greater than a threshold; deriving a first value and a second value from sensing values of sensing blocks included in the processing region; calculating a ratio of the first value to the second value; and identifying the touch event according to at least the ratio.

24 Claims, 10 Drawing Sheets

| | X1 | X2 | X3 | X4 | X5 | X6 | X7 | X8 |
|---|---|---|---|---|---|---|---|---|
| Y9 | 0 | 2 | 4 | 0 | 3 | 1 | 1 | 1 |
| Y8 | 0 | 0 | 0 | 0 | 1 | 0 | 0 | 0 |
| Y7 | 0 | 0 | 0 | 1 | 46 | 64 | 12 | 0 |
| Y6 | 0 | 1 | 2 | 1 | 77 | (87) | 42 | 2 |
| Y5 | 0 | 8 | 56 | 69 | 47 | 55 | 9 | 2 |
| Y4 | 2 | 14 | 76 | (88) | 36 | 0 | 1 | 0 |
| Y3 | 2 | 6 | 32 | 63 | 3 | 3 | 1 | 2 |
| Y2 | 0 | 0 | 1 | 5 | 0 | 2 | 0 | 0 |
| Y1 | 0 | 0 | 0 | 0 | 0 | 0 | 0 | 0 |

R1 — 300

Sensing value distribution

Contour lines

| | X1 | X2 | X3 | X4 | X5 | X6 | X7 | X8 | X9 | X10 | X11 | X12 | X13 | X14 | X15 |
|---|---|---|---|---|---|---|---|---|---|---|---|---|---|---|---|
| Y9 | 0 | 1 | 0 | 1 | 0 | 0 | 1 | 1 | 1 | 0 | 0 | 0 | 0 | 0 | 0 |
| Y8 | 0 | 1 | 0 | 0 | 0 | 1 | 2 | 1 | 2 | 0 | 0 | 1 | 0 | 0 | 0 |
| Y7 | 0 | 0 | 0 | 0 | 0 | 0 | 0 | 0 | 0 | 0 | 0 | 0 | 0 | 0 | 0 |
| Y6 | 0 | 0 | 0 | 0 | 0 | 0 | 1 | 0 | 2 | 4 | 0 | 0 | 0 | 0 | 2 |
| Y5 | 0 | 0 | 0 | 1 | 0 | 3 | 3 | 0 | 6 | 2 | 0 | 0 | 0 | 0 | 0 |
| Y4 | 0 | 1 | 2 | 2 | 4 | 9 | 65 | 84 | 88 | 95 | 19 | 3 | 2 | 2 | 2 |
| Y3 | 0 | 1 | 1 | 3 | 0 | 4 | 62 | 81 | 72 | 92 | 15 | 1 | 2 | 2 | 2 |
| Y2 | 0 | 0 | 1 | 3 | 0 | 0 | 5 | 4 | 4 | 7 | 0 | 1 | 0 | 0 | 1 |
| Y1 | 0 | 0 | 0 | 1 | 0 | 0 | 0 | 2 | 0 | 0 | 2 | 0 | 0 | 0 | 0 |

Sensing value distribution

Contour lines

METHOD OF IDENTIFYING TOUCH EVENT ON TOUCH PANEL BY SHAPE OF SIGNAL GROUP AND COMPUTER READABLE MEDIUM THEREOF

BACKGROUND OF THE INVENTION

1. Field of the Invention

The disclosed embodiments of the present invention relate to touch event identification, and more particularly, to a method of identifying a touch event (e.g. a single-touch or multi-touch event) on a touch panel by a shape of a signal group (generated in response to the touch event) and a computer readable medium thereof.

2. Description of the Prior Art

In recent years, touch-based applications have dominated the market. A touch controller identifies touch positions on a touch panel when a touch event occurs. When the touch panel is touched at two points, two signal groups are generated accordingly. When the two points are too close, however, the touch controller may erroneously identify the two signal groups as a single group, incorrectly reporting the touch events as a single touch position. In order to prevent this from happening, manufacturers can define multi-touch events using a specified distance between two fingers. Even with this modification, however, there is still room for improvement of identification accuracy.

Thus, there is a need for an innovative method which can enhance the identification accuracy for both single and multi-touch events on a touch panel.

SUMMARY OF THE INVENTION

In accordance with exemplary embodiments of the present invention, a method of identifying a touch event (e.g. a single-touch or multi-touch event) on a touch panel by a shape of a signal group generated in response to the touch event and a related computer readable medium are provided to solve the above-mentioned problem.

According to an embodiment of the present invention, an exemplary method of identifying a touch event on a touch panel is disclosed. The touch panel includes a plurality of sensing blocks. The sensing blocks have a plurality of corresponding sensing values generated in response to the touch event. The exemplary method includes the following steps: selecting a processing region on the touch panel, wherein the processing region comprises at least a portion of sensing blocks each having a sensing value greater than a threshold; deriving a first value and a second value from sensing values of sensing blocks included in the processing region; calculating a ratio of the first value to the second value; and identifying the touch event according to at least the ratio.

According to an embodiment of the present invention, an exemplary computer readable medium is disclosed. The exemplary computer readable medium has a program code stored therein. When executed by a processor, the program code causes the processor to execute the following steps: selecting a processing region on the touch panel, wherein the processing region comprises at least a portion of sensing blocks each having a sensing value greater than a threshold; deriving a first value and a second value from sensing values of sensing blocks included in the processing region; calculating a ratio of the first value to the second value; and identifying the touch event according to at least the ratio.

The proposed method can correctly identify different types of touch events (e.g. a single-touch event and a multi-touch event) by shapes of signal groups generated in response to the touch events. In addition, a self-sensing operation can be performed to enhance the accuracy of the identification.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
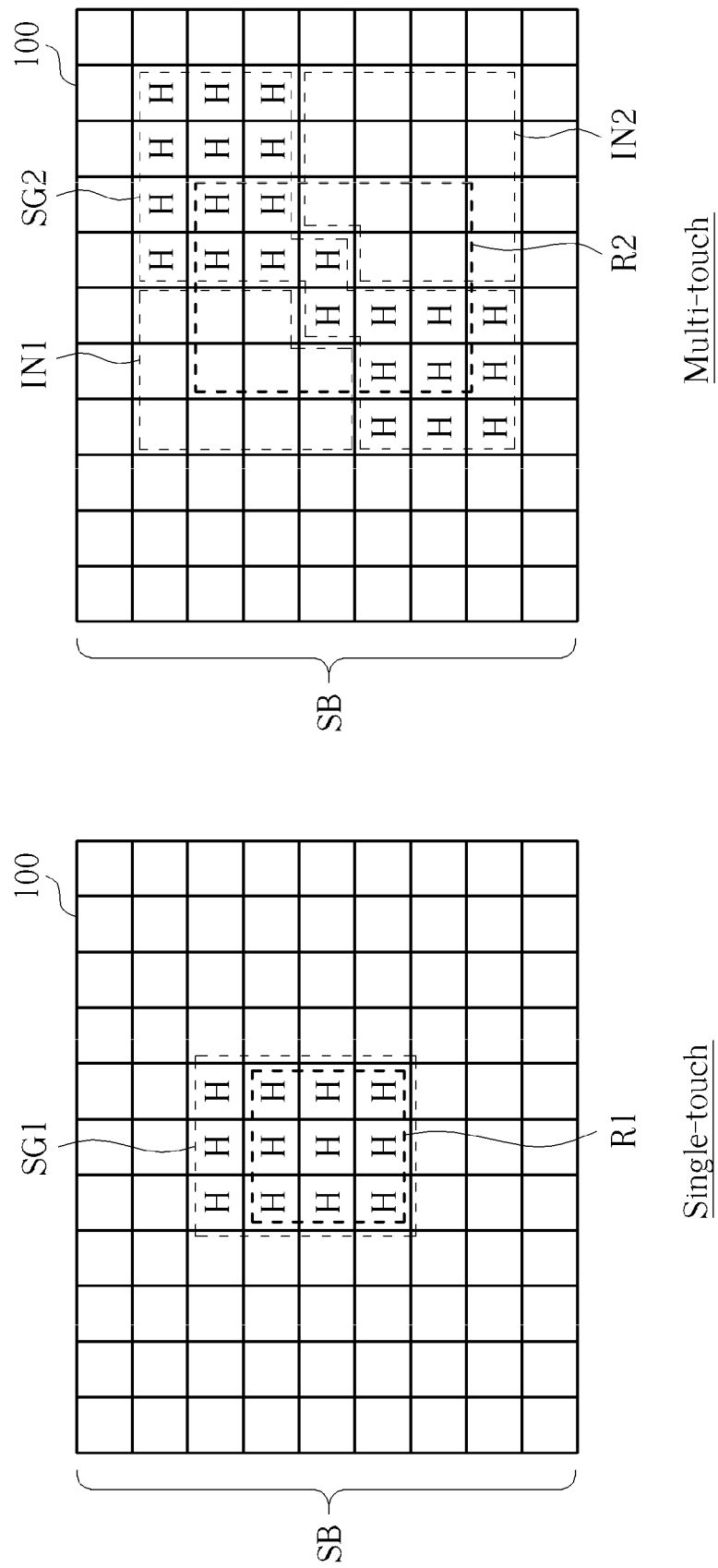
FIG. 1 is a diagram illustrating shapes of different signal groups and generated in response to different types of touch events on a touch panel.
Figure 2:
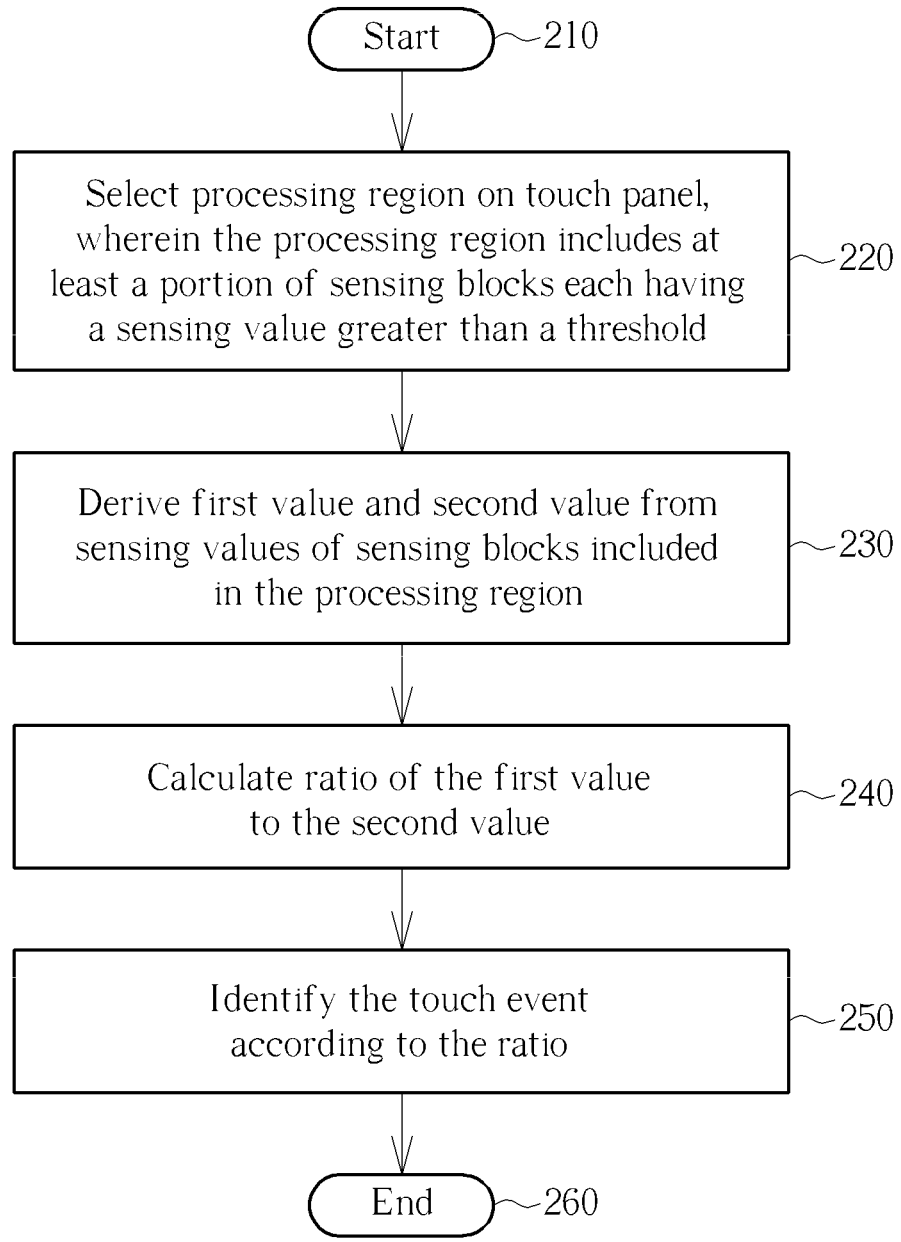
FIG. 2 is a flowchart illustrating a generalized method of identifying a touch event on a touch panel according to an embodiment of the present invention.

As different types of touch events (e.g. a single-touch event and a multi-touch event) may induce different shapes of signal groups, the different types of touch events may be identified according to the different shapes of the signal groups. Please refer to FIG. 1 and FIG. 2 together. FIG. 1 is a diagram illustrating shapes of different signal groups SG1 and SG2 generated in response to different types of touch events on a touch panel 100. The touch panel 100 may include a plurality of sensing blocks SB, and the sensing blocks may have a plurality of corresponding sensing values generated in response to a single-touch or a multi-touch event. In addition, each of the signal groups SG1 and SG2 includes sensing blocks having sensing values greater than a threshold (labeled 'H' in FIG. 1), and other blank sensing blocks have sensing values lower than the threshold. FIG. 2 is a flowchart illustrating a generalized method of identifying a touch event on a touch panel according to an embodiment of the present invention, wherein the generalized method may be employed to identify and distinguish between a single-touch event and a multi-touch event.

As shown in FIG. 1, the shape of the signal group SG2 (the right portion of FIG. 1) may have indentions (e.g. regions IN1 and IN2). Therefore, the different types of touch events may be identified according to the different shapes of the signal groups SG1 and SG2. In this embodiment, processing regions R1 and R2 may be selected first, wherein the processing regions R1 and R2 include at least a portion of sensing blocks each having a sensing value greater than the threshold, respectively (step 210). For each of the processing regions R1 and R2, a first value and a second value may be derived from sensing values of sensing blocks included in the processing region R1/R2 (step 220), and a ratio of the first value to the second value may be calculated (step 230). The calculated ratio may indicate shape information of the signal group SG1/SG2 if the appropriate first and second values are selected, and the touch event may be identified accordingly (step 240). In one implementation, the first value may be generated by averaging sensing values of at least a portion of the sensing blocks included in the processing region. For example, the first value for the region R1 may be generated by averaging sensing values of all sensing blocks included in the region R1, and the second value may be obtained by selecting a maximum sensing value from sensing values of all sensing blocks included in the region R1. The first value for the region R2 may be generated by averaging sensing values of all sensing blocks included in the region R2, and the second value may obtained by selecting a maximum sensing value from sensing values of all sensing blocks included in the region R2. Please note that this is for illustrative purposes only, and is not meant to be a limitation of the present invention. In an alternative design, the first value may be generated by other means such as arithmetic calculations/manipulations. In another alternative design, the second value may be obtained by selecting a minimum sensing value or any appropriate sensing value. In yet another alternative design, at least a maximum sensing value of the sensing values of the sensing blocks included in the processing region R1/R2 may not be involved in generating the first value.

Based on the aforementioned identification method, the exemplary method shown in FIG. 2 may be briefly summarized as follows.

Step 210: Start.

Step 220: Select a processing region on a touch panel, wherein the processing region includes at least a portion of sensing blocks each having a sensing value greater than a threshold.

Step 230: Derive a first value and a second value from sensing values of sensing blocks included in the processing region.

Step 240: Calculate a ratio of the first value to the second value.

Step 250: Identify the touch event according to the ratio.

Step 260: End.

Provided that the result is substantially the same, the above steps are not required to be executed in the exact order shown in FIG. 2. In addition, the ratio may be compared with a predetermined value to identify the touch event. Further description is detailed as follows.

Figure 3:
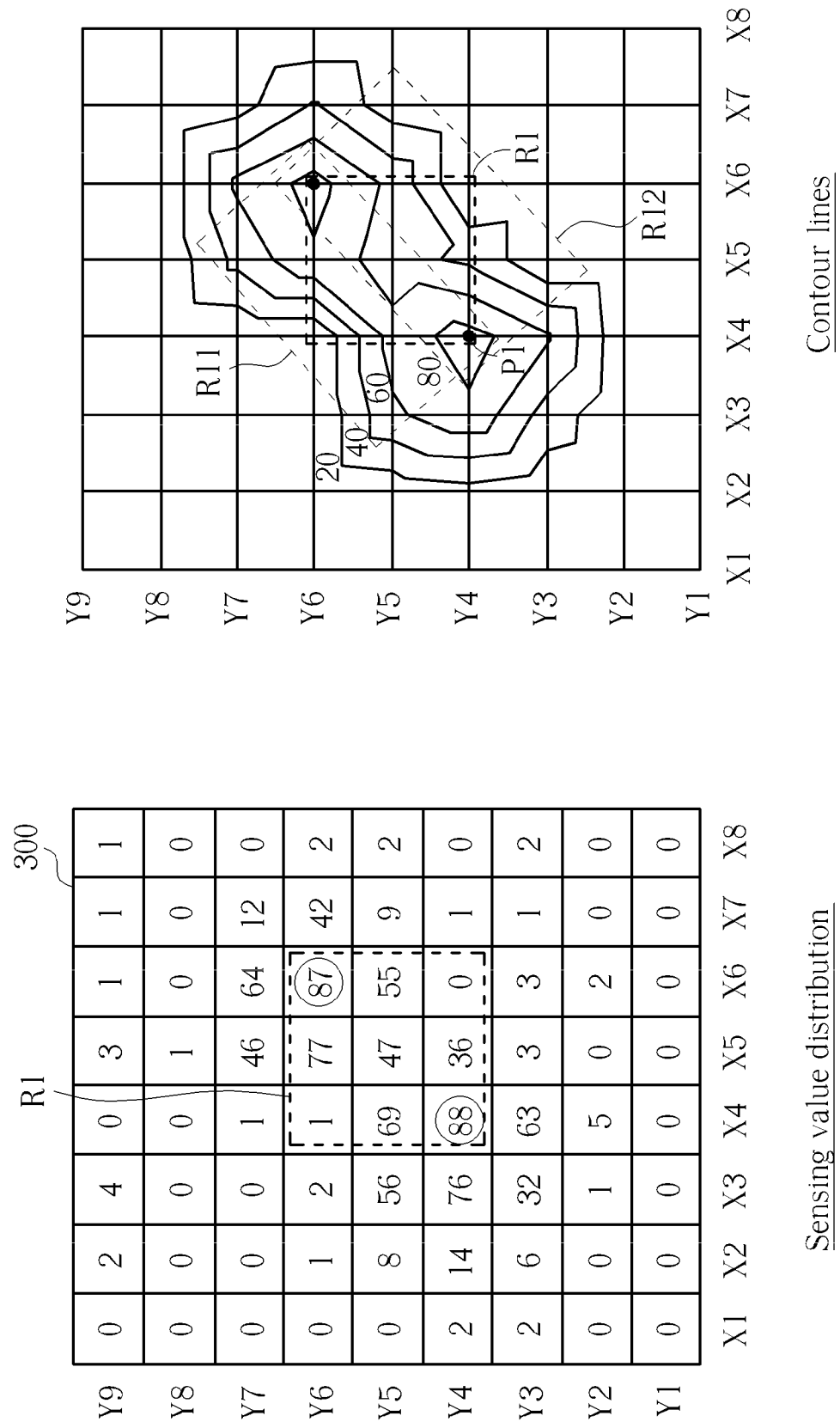
FIG. 3 is a diagram illustrating a sensing value distribution generated in response to a multi-touch event and contour lines thereof.
Figure 4:
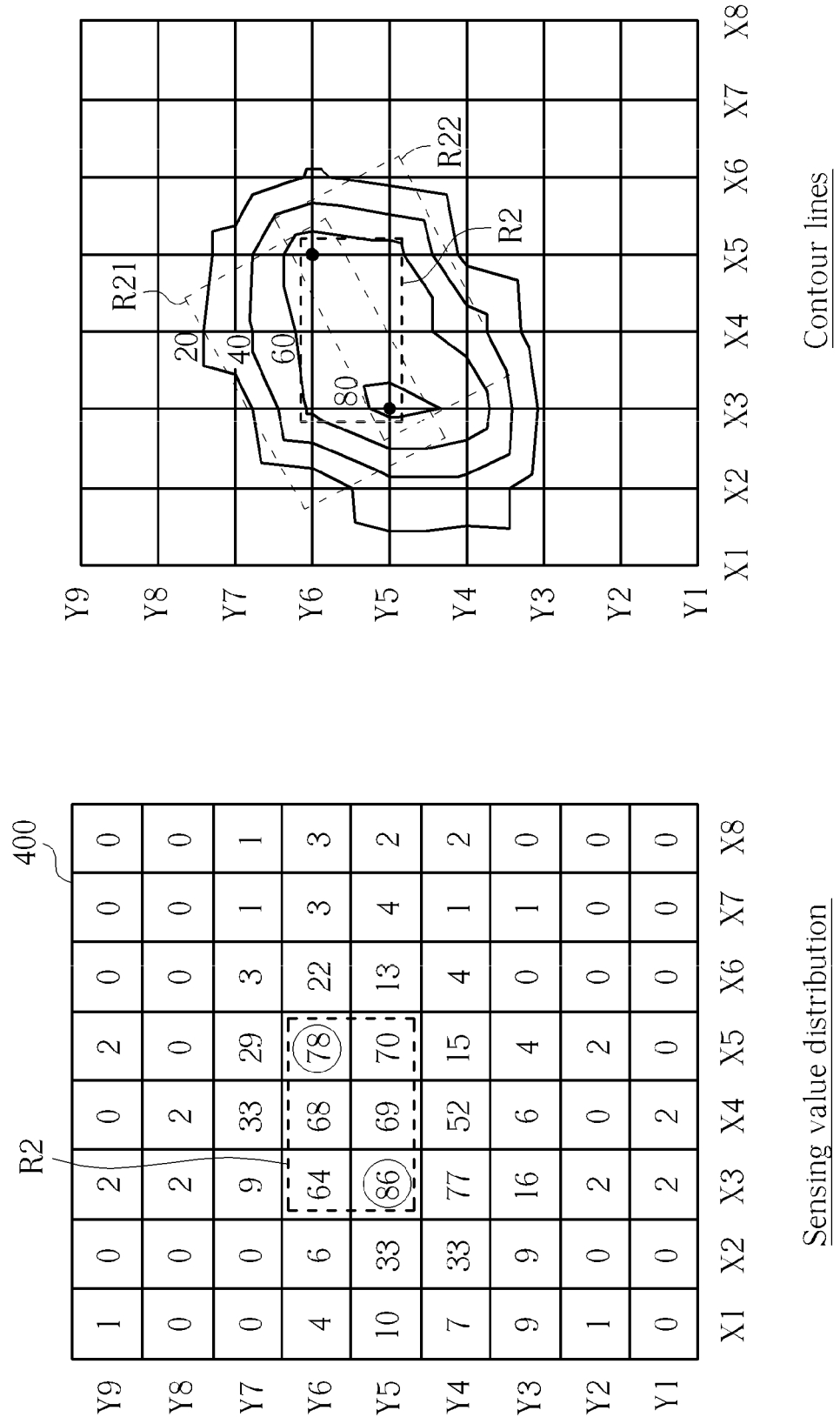
FIG. 4 is a diagram illustrating a sensing value distribution generated in response to a single-touch event and contour lines thereof.

Please refer to FIG. 3 and FIG. 4 in conjunction with FIG. 2. FIG. 3 is a diagram illustrating a sensing value distribution generated in response to a multi-touch event and contour lines thereof, and FIG. 4 is a diagram illustrating a sensing value distribution generated in response to a single-touch event and contour lines thereof. As shown in the left portion of FIG. 3/FIG. 4, a touch panel 300/400 includes, but is not limited to, a plurality of sensing blocks X1Y1-X9Y9, wherein the sensing block 'XmYn' is an intersection block between a sensing block column 'Xm' and a sensing block row 'Yn'. The number of each sensing block represents a sensing value generated in response to the multi-touch/single-touch event. In the right portion of FIG. 3/FIG. 4, each sensing block shown in the left portion of FIG. 3/FIG. 4 may be represented as an intersection point between a horizontal line (corresponding to a sensing block row) and a vertical line (corresponding to a sensing block column) for simplicity and clarity. For example, the point P1 corresponds to the sensing block X4Y4.

In these embodiments shown in FIG. 3 and FIG. 4, it is assumed that a valid sensing value is higher than 20 (i.e. a threshold). Two sensing blocks having a maximum sensing value and a sub-maximum sensing value may be selected to determine a processing region for identification. More particularly, in the left portion of FIG. 3, the sensing blocks X4Y4 and X6Y6 may be selected to determine a processing region R1 for identifying the touch event (i.e. the two-touch event) received by the touch panel 300, wherein the processing region R1 may be a quadrangle, and the sensing blocks X4Y4 and X6Y6 are arranged diagonally in the processing region R1 (step 220). As shown in the right portion of FIG. 3, there are two sensing values (corresponding to the sensing blocks X4Y6 and X6Y4) lower than 20 (i.e. the threshold) in the determined processing region R1 due to the indentions. Similarly, in the left portion of FIG. 4, the sensing blocks X3Y5 and X5Y6 may be selected to determine a processing region R2 for identifying the touch event (i.e. the single-touch event) received by the touch panel 400, wherein the processing region R2 may be a quadrangle, and the sensing blocks X3Y5 and X5Y6 are arranged diagonally in the processing region R2 (step 220). As shown in the right portion of FIG. 4, each sensing value in the determined processing region R1 is greater than 60.

In these embodiments, the first value is generated by averaging sensing values of the sensing blocks included in the processing region, wherein a maximum sensing value and a sub-maximum sensing value of the sensing values of the sensing blocks included in the processing region are not involved in generating the first value. In addition, the maximum sensing value of the sensing values of the sensing blocks is selected as the second value. More particularly, in the left portion of FIG. 3, the first value for the processing region R1 is generated by averaging the sensing values of the sensing blocks X4Y5, X4Y6, X5Y4, X5Y5, X5Y6, X6Y4, and X6Y5, and the maximum sensing value corresponding to the sensing block X4Y4 is selected as the second value for the processing region R1 (step 230). Similarly, in the left portion of FIG. 4, the first value for the processing region R2 is generated by averaging the sensing values of the sensing blocks X3Y6, X4Y5, X4Y6 and X6Y5, and the maximum sensing value corresponding to the sensing block X3Y5 is selected as the second value for the processing region R2 (step 230). Based on the aforementioned description, the first values for the processing regions R1 and R2 are 40.71 and 67.75, respectively, and the second values for the processing regions R1 and R2 are 88 and 86, respectively. In a case where the ratio is derived from dividing the first value by the second value, the ratios for the processing regions R1 and R2 are 0.46 and 0.79, respectively. As the calculated ratio for the processing regions R2 (i.e. 0.79) is much greater than the calculated ratio for the processing regions R1 (i.e. 0.46), the two types of touch events may be identified correctly (steps 230 and 240). In one implementation, each of the calculated ratios may be compared with a predetermined value to identify the touch event.

Please note that the aforementioned diagonal arrangement of the two sensing blocks having the maximum sensing value and the sub-maximum sensing value is for illustrative purposes only, and is not meant to be a limitation of the present invention. As shown in the right portion of FIG. 3, the sensing blocks X4Y4 and X6Y6 may be selected to determine a processing region R11 for covering the indentions (e.g. the sensing value of the sensing blocks X4Y6). In one implementation, the sensing blocks X4Y4 and X6Y6 may be selected to determine a processing region R12 for covering the indentions (e.g. the sensing value of the sensing blocks X6Y4). In other words, the two sensing blocks having the maximum sensing value and the sub-maximum sensing value may be arranged in various manners as long as the determined processing region covers the indentions. In addition, as shown in the right portion of FIG. 4, even if another processing region R21/R22 is selected for identification based on the similar selection principle of the processing region R11/R12, the calculated ratio is still greater than that obtained from the processing region R11/R12.

Figure 5:
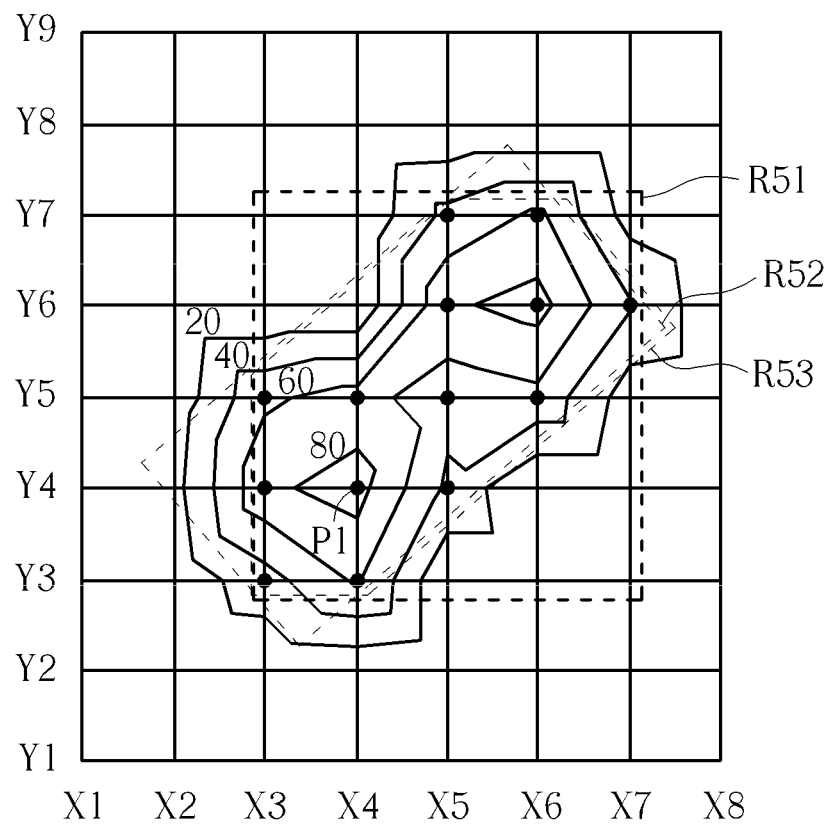
FIG. 5 is a diagram illustrating an implementation of processing region determination for the multi-touch event shown in FIG. 3.
Figure 6:
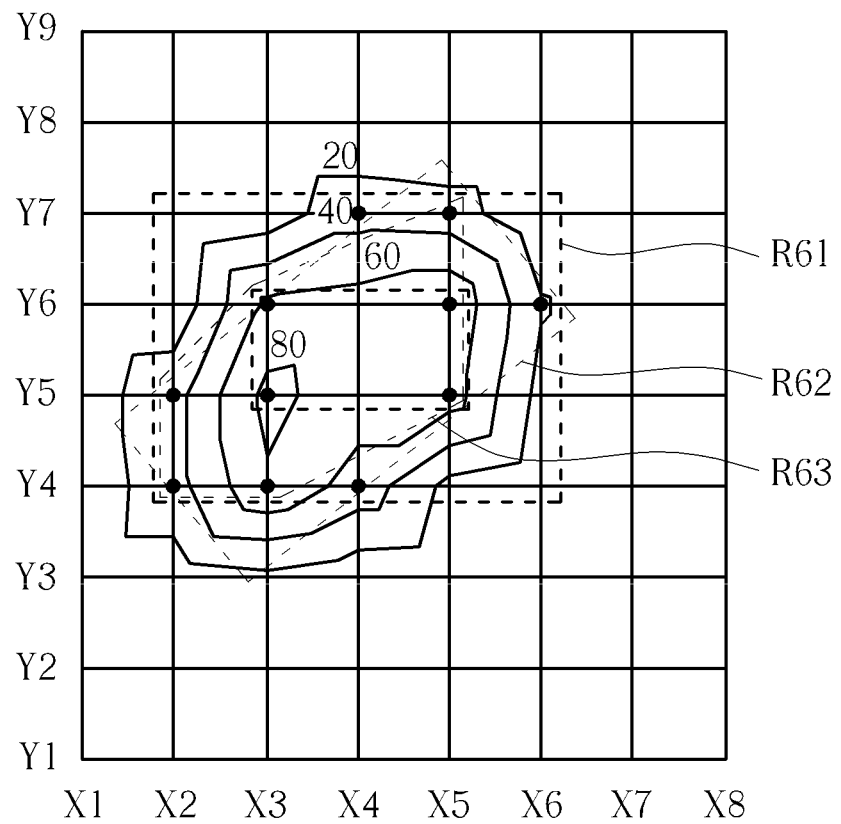
FIG. 6 is a diagram illustrating an implementation of processing region determination for the single-touch event shown in FIG. 4.

In one implementation, the processing region may not be a quadrangle as long as the determined processing region covers the indentions. Please refer to FIG. 5 and FIG. 6 together. FIG. 5 is a diagram illustrating an implementation of processing region determination for the multi-touch event shown in FIG. 3, wherein the contour lines shown in FIG. 5 are identical to those shown in the right portion of FIG. 3. FIG. 6 is a diagram illustrating an implementation of processing region determination for the single-touch event shown in FIG. 4, wherein the contour lines shown in FIG. 6 are identical to those shown in the right portion of FIG. 4. As shown in FIG. 5, the processing region R51 may be selected for identification, wherein the processing region R51 is a quadrangle which covers all the sensing blocks each having the sensing value greater than the threshold (i.e. 20). In another implementation, the processing region R52 may be selected for identification, wherein the processing region R52 is a minimum quadrangle which covers all the sensing blocks each having the sensing value greater than the threshold. In yet another implementation, the processing region R53 may be selected for identification, wherein there are at least two sides of the processing region R53 parallel to the joint line between the two sensing blocks having the maximum sensing value and the sub-maximum sensing value (i.e. the sensing blocks X4Y4 and X6Y6). Similarly, as shown in FIG. 6, the processing regions R61-R63 may be selected for identification, wherein the determination principles of the processing regions R61-R63 correspond to those of the processing regions R51-R53, respectively.

Figure 7:
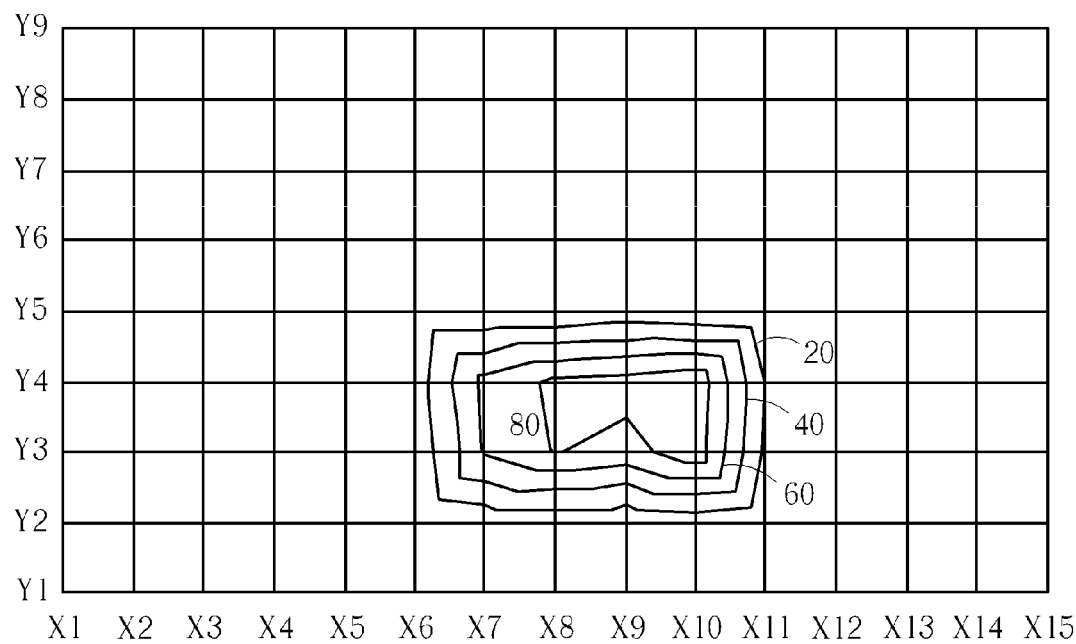
FIG. 7 is a diagram illustrating a sensing value distribution generated in response to a multi-touch event and contour lines thereof.
Figure 8:
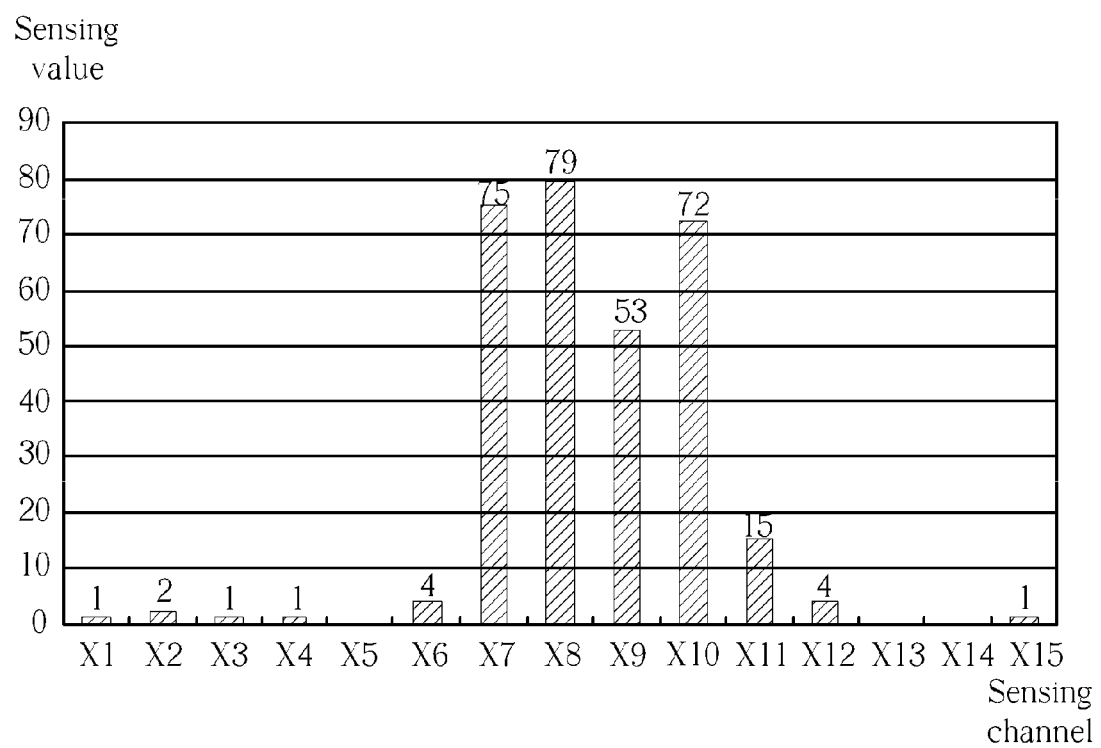
FIG. 8 is a diagram illustrating a relation between sensing values and sensing channels for the multi-touch event shown in FIG. 7.

When a touch event is triggered by two very close objects (e.g. two close fingers), a self-sensing operation may be performed to identify the touch event. Please refer to FIG. 7 and FIG. 8 together. FIG. 7 is a diagram illustrating a sensing value distribution generated in response to a multi-touch event and contour lines thereof, and FIG. 8 is a diagram illustrating a relation between sensing values and sensing channels for the multi-touch event shown in FIG. 7, wherein the sensing values are obtained by utilizing a self-sensing operation. As shown in the top portion of FIG. 7, a touch panel 700 includes, but is not limited to, a plurality of sensing blocks X1Y1-X15Y9, wherein the sensing block 'XmYn' is an intersection block between a sensing block column 'Xm' and a sensing block row 'Yn'. The number of each sensing block represents a sensing value thereof generated in response to the multi-touch event. In the bottom portion of FIG. 7, each sensing block shown in the top portion of FIG. 7 may be represented as an intersection point between a horizontal line (corresponding to a sensing block row) and a vertical line (corresponding to a sensing block column) for simplicity and clarity. In this embodiment, each of the sensing channels shown in FIG. 8 may correspond to the sensing block row/column shown in FIG. 7. For example, the sensing channels may correspond to the sensing block columns (i.e. the sensing block column X1-X15), respectively.

Figure 9:
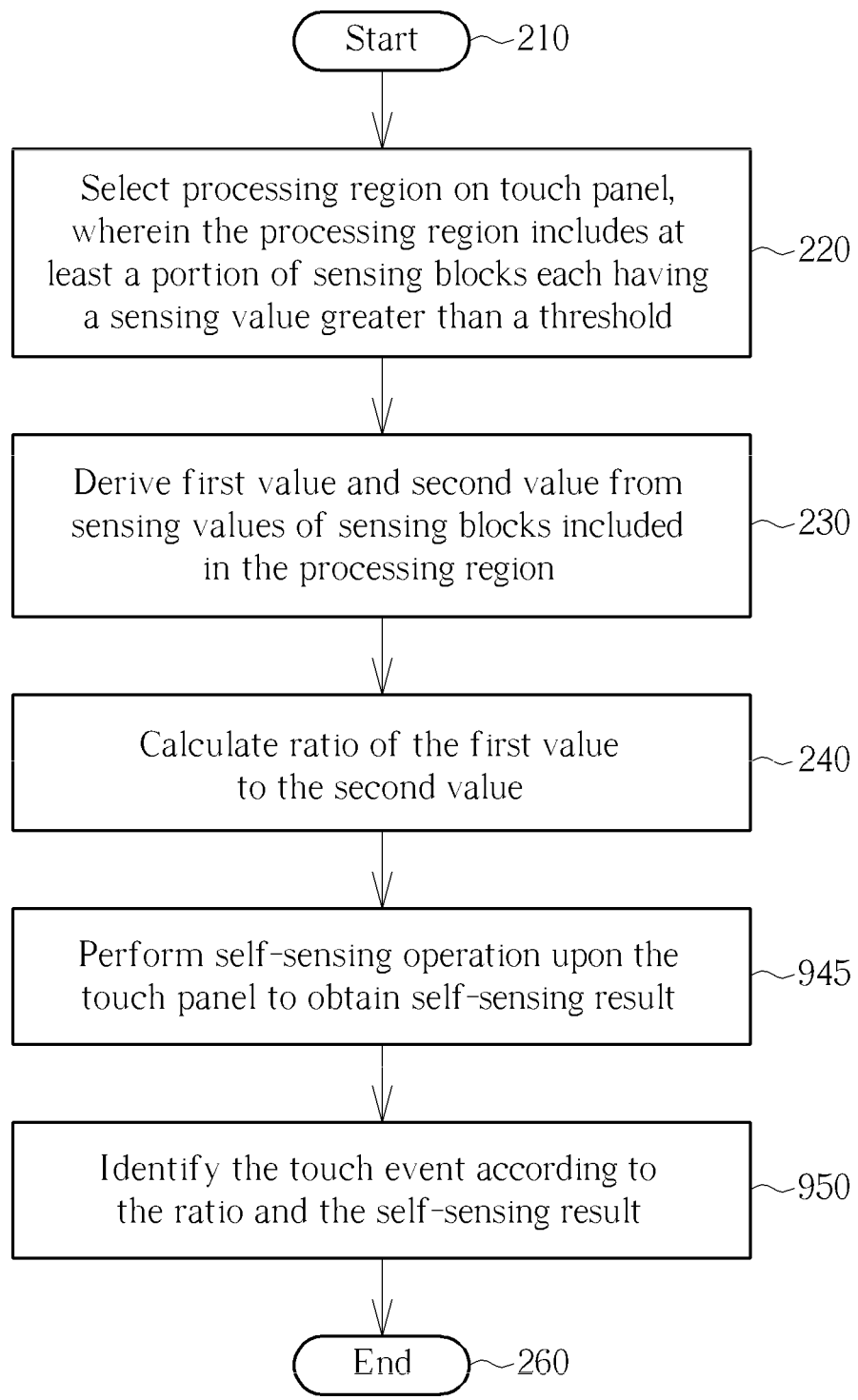
FIG. 9 is a flowchart illustrating an exemplary method of identifying a touch event on a touch panel according to an embodiment of the present invention.

As shown in FIG. 7, because the multi-touch event is triggered by two very close objects, sensing blocks having sensing values over a threshold may be connected to each other, resulting in the non-obvious indention phenomenon. In other words, the multi-touch event may be misjudged as a single-touch event. As shown in FIG. 8, a self-sensing result obtained by performing a self-sensing operation upon the touch panel 700 indicates that there are two local maximum sensing values, so that the multi-touch event may be identified correctly according to the self-sensing result. Please refer to FIG. 9 for a better understanding of the technical features of the present invention. FIG. 9 is a flowchart illustrating an exemplary method of identifying a touch event on a touch panel according to an embodiment of the present invention, wherein the exemplary method shown in FIG. 9 is based on the generalized method shown in FIG. 2. Steps which are the same as those shown in FIG. 2 are annotated with the same numerals. The exemplary method shown in FIG. 9 may be briefly summarized as follows.

Step 210: Start.

Step 220: Select a processing region on a touch panel, wherein the processing region includes at least a portion of sensing blocks each having a sensing value greater than a threshold.

Step 230: Derive a first value and a second value from sensing values of sensing blocks included in the processing region.

Step 240: Calculate a ratio of the first value to the second value.

Step 945: Perform a self-sensing operation upon the touch panel to obtain a self-sensing result.

Step 950: Identify the touch event according to the ratio and the self-sensing result.

Step 260: End.

Provided that the result is substantially the same, the above steps are not required to be executed in the exact order shown in FIG. 9. For example, the step 945 may be executed before the step 220. In one implementation, when at least one of the ratio and the self-sensing result indicates that there is more than one touch point on the touch panel, it may be determined that the touch event is a multi-touch event. In another implementation, the touch event may be identified according to the ratio determined before the self-sensing operation is performed, and when the touch event is identified as the multi-touch event according to the ratio, the steps 945 and 950 may be skipped. As a person skilled in the art can readily understand the operation of the method shown in FIG. 9 after reading the paragraphs directed to FIGS. 1-8, further description is omitted for brevity.

Figure 10:
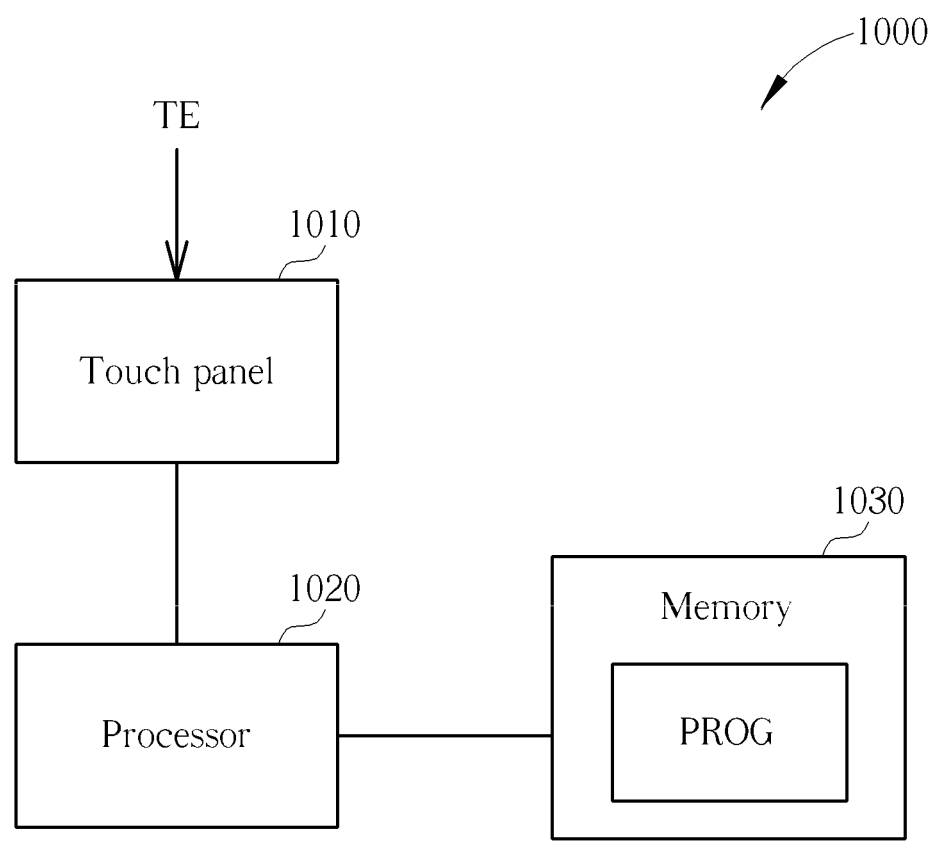
FIG. 10 is a block diagram illustrating an exemplary touch apparatus according to an embodiment of the present invention.

The steps shown in FIG. 2 and FIG. 9 may be implemented in various manners. For example, each step may be translated into a program code by commands, parameters, and variables of a specific program language. Please refer to FIG. 10, which is a block diagram illustrating an exemplary touch apparatus 1000 according to an embodiment of the present invention. As shown in FIG. 10, a program code PROG is stored in a computer readable medium 1030 (e.g. a non-volatile memory), and a processor 1020 (e.g. a micro control unit or a central processing unit) is instructed to execute each step of the proposed method by fetching and executing the program code PROG. When executed by the processor 1020, the program code PROG causes the processor 1020 to execute at least the following steps: selecting a processing region on the touch panel 1010, wherein the processing region comprises at least a portion of sensing blocks each having a sensing value greater than a threshold; deriving a first value and a second value from sensing values of sensing blocks included in the processing region; calculating a ratio of the first value to the second value; and identifying a touch event TE according to at least the ratio.

In summary, the proposed method can correctly identify different types of touch events by shapes of signal groups generated in response to the touch events. In addition, a self-sensing operation can be performed to enhance the accuracy of the identification.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of identifying a touch event on a touch panel, the touch panel comprising a plurality of sensing blocks, the sensing blocks having a plurality of corresponding sensing values generated in response to the touch event, the method comprising:
    selecting a processing region on the touch panel, wherein the processing region comprises at least a portion of sensing blocks each having a sensing value greater than a threshold;
    deriving a first value and a second value from sensing values of sensing blocks included in the processing region, wherein at least one of sensing values used for deriving the first value is greater than the threshold, and at least one of sensing values used for deriving the second value is greater than the threshold;
    calculating a ratio of the first value to the second value; and
    identifying the touch event according to at least the ratio;
    wherein the step of identifying the touch event according to at least the ratio comprises:
    comparing the ratio with a predetermined value to identify the touch event, wherein when the ratio is greater than the predetermined value, it is determined that the touch event is a multi-touch event.

2. The method of claim 1, wherein the step of deriving the first value and the second value comprises:
    generating the first value by averaging sensing values of at least a portion of the sensing blocks included in the processing region.

3. The method of claim 2, wherein at least a maximum sensing value of the sensing values of the sensing blocks included in the processing region is not involved in generating the first value.

4. The method of claim 2, wherein the step of deriving the first value and the second value comprises:
    selecting a maximum sensing value of the sensing values of the sensing blocks included in the processing region as the second value.

5. The signal processing method of claim 1, wherein the processing region is a quadrangle.

6. The signal processing method of claim 5, wherein the processing region covers all the sensing blocks each having the sensing value greater than the threshold.

7. The signal processing method of claim 6, wherein the processing region is a minimum quadrangle which covers all the sensing blocks each having the sensing value greater than the threshold.

8. The signal processing method of claim 5, wherein the processing region has a first sensing block and a second sensing block located at corners, the first sensing block has a maximum sensing value of the sensing values of the sensing blocks included in the processing region, and the second sensing block has a sub-maximum sensing value of the sensing values of the sensing blocks included in the processing region.

9. The signal processing method of claim 8, wherein the first sensing block and the second sensing block are arranged diagonally in the processing region.

10. The signal processing method of claim 1, further comprising:
    performing a self-sensing operation upon the touch panel to obtain a self-sensing result;
    and the step of identifying the touch event according to at least the ratio comprises:
    identifying the touch event according to the ratio and the self-sensing result.

11. The method of claim 10, wherein the step of identifying the touch event according to the ratio and the self-sensing result comprises:
    when at least one of the ratio and the self-sensing result indicates that there is more than one touch point on the touch panel, determining that the touch event is a multi-touch event.

12. The method of claim 1, wherein when the ratio is less than the predetermined value, it is determined that the touch event is a single-touch event.

13. A non-transitory computer readable medium having a program code stored therein, wherein when executed by a processor, the program code causes the processor to execute the following steps:
    selecting a processing region on the touch panel, wherein the processing region comprises at least a portion of sensing blocks each having a sensing value greater than a threshold;
    deriving a first value and a second value from sensing values of sensing blocks included in the processing region, wherein at least one of sensing values used for deriving the first value is greater than the threshold, and at least one of sensing values used for deriving the second value is greater than the threshold;
    calculating a ratio of the first value to the second value; and
    identifying the touch event according to at least the ratio;
    wherein the step of identifying the touch event according to at least the ratio comprises:
    comparing the ratio with a predetermined value to identify the touch event, wherein when the ratio is greater than the predetermined value, it is determined that the touch event is a multi-touch event.

14. The non-transitory computer readable medium of claim 13, wherein deriving the first value and the second value comprises:
    generating the first value by averaging sensing values of at least a portion of the sensing blocks included in the processing region.

15. The non-transitory computer readable medium of claim 14, wherein at least a maximum sensing value of the sensing values of the sensing blocks included in the processing region is not involved in generating the first value.

16. The non-transitory computer readable medium of claim 14, wherein deriving the first value and the second value comprises:
    selecting a maximum sensing value of the sensing values of the sensing blocks included in the processing region as the second value.

17. The non-transitory computer readable medium of claim 13, wherein the processing region is a quadrangle.

18. The non-transitory computer readable medium of claim 17, wherein the processing region covers all the sensing blocks each having the sensing value greater than the threshold.

19. The non-transitory computer readable medium of claim 18, wherein the processing region is a minimum quadrangle which covers all the sensing blocks each having the sensing value greater than the threshold.

20. The non-transitory computer readable medium of claim 17, wherein the processing region has a first sensing block and a second sensing block located at corners, the first sensing block has a maximum sensing value of the sensing values of the sensing blocks included in the processing region, and the second sensing block has a sub-maximum sensing value of the sensing values of the sensing blocks included in the processing region.

21. The non-transitory computer readable medium of claim 18, wherein the first sensing block and the second sensing block are arranged diagonally in the processing region.

22. The non-transitory computer readable medium of claim 13, wherein the program code further causes the processor to perform a self-sensing operation upon the touch panel to obtain a self-sensing result, and the step of identifying the touch event according to at least the ratio comprises:
identifying the touch event according to the ratio and the self-sensing result.

23. The non-transitory computer readable medium of claim 22, wherein identifying the touch event according to the ratio and the self-sensing result comprises:
when at least one of the ratio and the self-sensing result indicates that there is more than one touch point on the touch panel, determining that the touch event is a multi-touch event.

24. The non-transitory computer readable medium of claim 13, wherein when the ratio is less than the predetermined value, it is determined that the touch event is a single-touch event.

* * * * *